US010826596B2

(12) United States Patent
Vasavada et al.

(10) Patent No.: US 10,826,596 B2
(45) Date of Patent: Nov. 3, 2020

(54) PLACEMENT OF CALIBRATION EARTH STATIONS FOR GROUND BASED BEAM FORMING IN A SATELLITE SYSTEM

(71) Applicants: Yash Vasavada, Gaithersburg, MD (US); Channasandra Ravishankar, Clarksburg, MD (US); John Corrigan, Chevy Chase, MD (US); Gaguk Zakaria, College Park, MD (US); Xiaoling Huang, Boyds, MD (US)

(72) Inventors: Yash Vasavada, Gaithersburg, MD (US); Channasandra Ravishankar, Clarksburg, MD (US); John Corrigan, Chevy Chase, MD (US); Gaguk Zakaria, College Park, MD (US); Xiaoling Huang, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 291 days.

(21) Appl. No.: 15/902,784

(22) Filed: Feb. 22, 2018

(65) Prior Publication Data

US 2019/0033464 A1    Jan. 31, 2019

Related U.S. Application Data

(60) Provisional application No. 62/537,959, filed on Jul. 28, 2017.

(51) Int. Cl.
*H04B 7/185*     (2006.01)
*H04B 7/204*     (2006.01)
*H01Q 25/00*     (2006.01)

(52) U.S. Cl.
CPC ....... *H04B 7/18513* (2013.01); *H01Q 25/007* (2013.01); *H04B 7/18519* (2013.01); *H04B 7/2041* (2013.01)

(58) Field of Classification Search
CPC . G01S 19/40; H04B 7/18513; H04B 7/18517; H04B 7/2041; H04B 7/18519; H01Q 25/007
See application file for complete search history.

(56) References Cited

U.S. PATENT DOCUMENTS 8,923,756 B1* 12/2014 Freedman ............ H04B 7/2041
                                                455/12.1
9,768,859 B2*  9/2017 Sayegh ................. H04W 88/16
(Continued)

OTHER PUBLICATIONS

International Search Report for PCT/US2018/042824 dated Oct. 19, 2018.

(Continued)

*Primary Examiner* — Erin F Heard
*Assistant Examiner* — Donald H B Braswell
(74) *Attorney, Agent, or Firm* — Capitol City Techlaw; Jasbir Singh

(57) ABSTRACT

A system and method for estimating calibration parameters and locating a Calibration Earth Station (CES) is described. The method may be performed offline. The method includes: providing L×M pilot signal measurements in a matrix R from L CESs and the M feed elements, wherein the matrix R comprises a set of channel coefficients c={c1, c2, . . . , cM}, and k={k1, k2, . . . , kL} perturbations; linking a subset of channel coefficients {c1, c2, . . . , cM} using each of the L CESs; and estimating a relative estimate of the k={k1, k2, . . . , kL} pertubations across the L CESs by using each of the L CESs as a bridging element. In the method, the bridging element provides a strong pilot signal for at least two of the L CESs. A set of criteria for determining locations of CESs have been described. A set of desirable properties for the solution set of L CESs have been disclosed. A combination of inner loop and outer loop methods for (Continued)

determining the final set of optimal locations have been described.

19 Claims, 5 Drawing Sheets

(56) References Cited

U.S. PATENT DOCUMENTS

2012/0218141 A1    8/2012   Vasavada et al.
2016/0087714 A1*  3/2016   Sayegh ................ H04L 5/0007
                                                  370/316

OTHER PUBLICATIONS

Vasavada Y et al., "Beam forming using an iterative bootstrapping technique", Military Communications Conference, 2011—MILCOM 2011, IEEE, Nov. 7, 2011 (Nov. 7, 2011), pp. 310-315, XP032092949, DOI: 10.1109/MILCOM.2011.6127682.

* cited by examiner

PLACEMENT OF CALIBRATION EARTH STATIONS FOR GROUND BASED BEAM FORMING IN A SATELLITE SYSTEM

CROSS REFERENCE TO RELATED APPLICATIONS

The present application claims the benefit of U.S. Provisional Patent Application No. 62/537,959 filed Jul. 28, 2017, whose contents is incorporated herein in its entirety.

FIELD

An offline determination of a calibration of a payload antenna array via simulation, number of Calibration Earth Stations (CESs) needed, and CES locations for a Ground-Based Beam Forming (GBBF) system is presented. Operational CESs of the Ground-Based Beam Forming (GBBF), can perform a real-time calibration of the payload antenna array per the present teachings. The operational CESs are placed within the satellite antenna coverage, for example, per the offline determination of CES locations.

BACKGROUND

It is well known that the satellites with multi-frequency multiple beams (in contrast to single-frequency single-beam payloads) offer many system advantages, the key benefit being an increase in the bandwidth efficiency by use of spectrum (frequency) reuse. In many satellite systems, multiple beams are formed using an array of on-board feed elements by means of phased array beamforming. There is a Fixed Beamforming Network (FBN) implemented behind the array of multiple feed elements. Ports on one side of this FBN are connected to the feed array and the ports on the other side are routed to the satellite Gateway via the feeder link. While this FBN provides for the frequency reuse, a drawback is that the pattern of the spot beams should be configured prior to the satellite launch and it cannot be adapted subsequently (e.g., if the system coverage requirements change). To remove this restriction, an on-board DSP is added in some satellite systems. Configuration of this payload DSP is possible anytime during the life of the spacecraft by means of a telemetry command. The resultant system is known as a Dynamic Beamforming Network (DBN) where the spot-beams can be added, deleted or repositioned to cater to hot-spot scenarios.

Both FBN and DBN are variants of On-Board Beamforming (OBBF). A disadvantage of OBBF is that it increases the payload SWaP (Size, Weight and Power), and hence the cost of satellite construction and launch. This has motivated development of moving the beamforming operation to the Satellite Earth Station (SES), thereby freeing the payload from housing the signal processing engine needed with OBBF.

In contrast to OBBF, the GBBF (Ground Based Beam Forming) technology permits a greater flexibility and makes possible the use of more advanced, and computationally intensive, beamforming processes that lead to the use of a smaller frequency reuse factor and hence an improved bandwidth efficiency.

In GBBF, multiple paths (one for each feed element) are maintained between the output of the DBN located on the ground and each feed element located on the spacecraft. This separation of feed element paths can be achieved using Frequency Division Multiplexing (FDM), in which each feed element signal is transported from/to the SES on a separate frequency band (although other methods, such as CDM, are also possible). With the FDM-based separation of feed element paths, a need for removing amplitude and phase imbalances across these FDM channels arises as the imbalanced FDM channels disturb the amplitude and phase offsets intentionally introduced at GBBF across the different feed element signals to form the directional spot beams. While the problem of calibration of OBBF has been investigated, the calibrating of the FDM channels in GBBF requires an altogether different design.

FIG. 1a illustrates a prior art Ground Based Beam Forming (GBBF) system including an on-board calibration network.

In FIG. 1a, a GBBF system 100 includes a GBBF beamformer 104 inserts a channel sounding pilot signal 112 on each of the FDM channels on a forward link. Antenna elements 108 disposed in a satellite receives the pilot signals 112 on all the FDM channels from a gateway 110, and loops them back via an on-board calibration network 106 to the GBBF 104 on a separate, or auxiliary, return FDM channel 114 that carries just these pilot signals. Similarly, for the return link, the GBBF 104 transmits a different pilot signal 116 on the auxiliary band. The satellite receives the different pilot signal 116 and inserts the pilot 116 in the return FDM channels that carry the user traffic. The forward link from the GBBF 104 may include a user traffic signal including signals from a network 102. The satellite illuminates a service link coverage area 103 with a beam.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

With growing need for satellite based communication systems, there is increasing focus on the technological advancements that can reduce the cost and SWaP (Size, Weight, and Power) of satellite payload without compromising the achieved bandwidth efficiency. In a recent technological development, the signal processing for payload antenna beamforming is moved to the ground. The resultant system is called Ground-Based Beam Forming (GBBF). An improper choice of locations of Calibration Earth Stations (CESs) used in the GBBF system can either result in more than a necessary number of CESs (thereby increasing the system cost and the CES site maintenance concerns) or can deteriorate the GBBF calibration performance.

A Ground-Based Beam Forming (GBBF) system (i) provides for a significant simplification to a satellite payload design, (ii) allows for an improved system performance, and (iii) results in a better system flexibility. The GBBF system provides a real-time calibration of a payload antenna array. In some embodiments of GBBF calibration, several transceiver systems or Calibration Earth Stations (CESs) are placed at strategic locations within the satellite antenna coverage. In the present teachings, a determination of the requisite number of CESs and their locations may be cast as a problem of multidimensional nonlinear optimization of the selected criteria. A solution, based on the stochastic annealing method, is developed, and its results are presented.

The present teachings disclose a method for estimating calibration parameters and locating a Calibration Earth Station (CES) receiving a signal from an antenna array with M elements is disclosed. The method includes: providing L×M pilot signal measurements in a matrix R from L CESs and the M feed elements, wherein the matrix R includes a set of channel coefficients c={c1, c2, . . . cM}, and k={k1, k2, . . . , kL} perturbations; linking a subset of channel coefficients {c1, c2, . . . , cM} using each of L CESs; and estimating a relative estimate of the k={k1, k2, . . . , kL} perturbations across the L CESs by using each of the L CESs as a bridging element. In the method, the bridging element provides a strong pilot signal for at least two of the L CESs.

A system to estimate calibration parameters and locate a Calibration Earth Station (CES) receiving a signal from an antenna array with M elements is disclosed. The system includes: a matrix R to provide L×M pilot signal measurements from L CESs and the M feed elements, wherein the matrix R comprises a set of channel coefficients c={c1, c2, . . . , cM}, and k={k1, k2, . . . , kL} perturbations; and a signal processor to link a subset of channel coefficients {c1, c2, . . . , cM} using each of the L CESs, and to estimate a relative estimate of the k={k1, k2, . . . , kL} perturbations across the L CESs by using one of the M feed elements as a bridging element. In the system, the bridging element provides a strong pilot signal for at least two of the L CESs.

A method for locating a Calibration Earth Station (CES) is disclosed. The method includes: providing pilot signal measurements R from L CESs, wherein R includes a set of channel coefficients c={c1, c2, . . . , cM}, k={k1, k2, . . . , kL} perturbations, and a noise component N; ensuring that each column of matrix R includes a plurality of strong secondary pattern connections; ensuring that each row of R includes a plurality of strong secondary pattern connections; bridging two neighboring CESs of the L CESs with a bridge CES connected by at least two neighboring feeds, and a bridge feed that bridges the two neighboring CESs; and performing simulated annealing with the bridge CES and the bridge feed to search for locations of the L CESs. In the method, the bridging comprises a plurality of bridge CESs.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

Figure 1A:
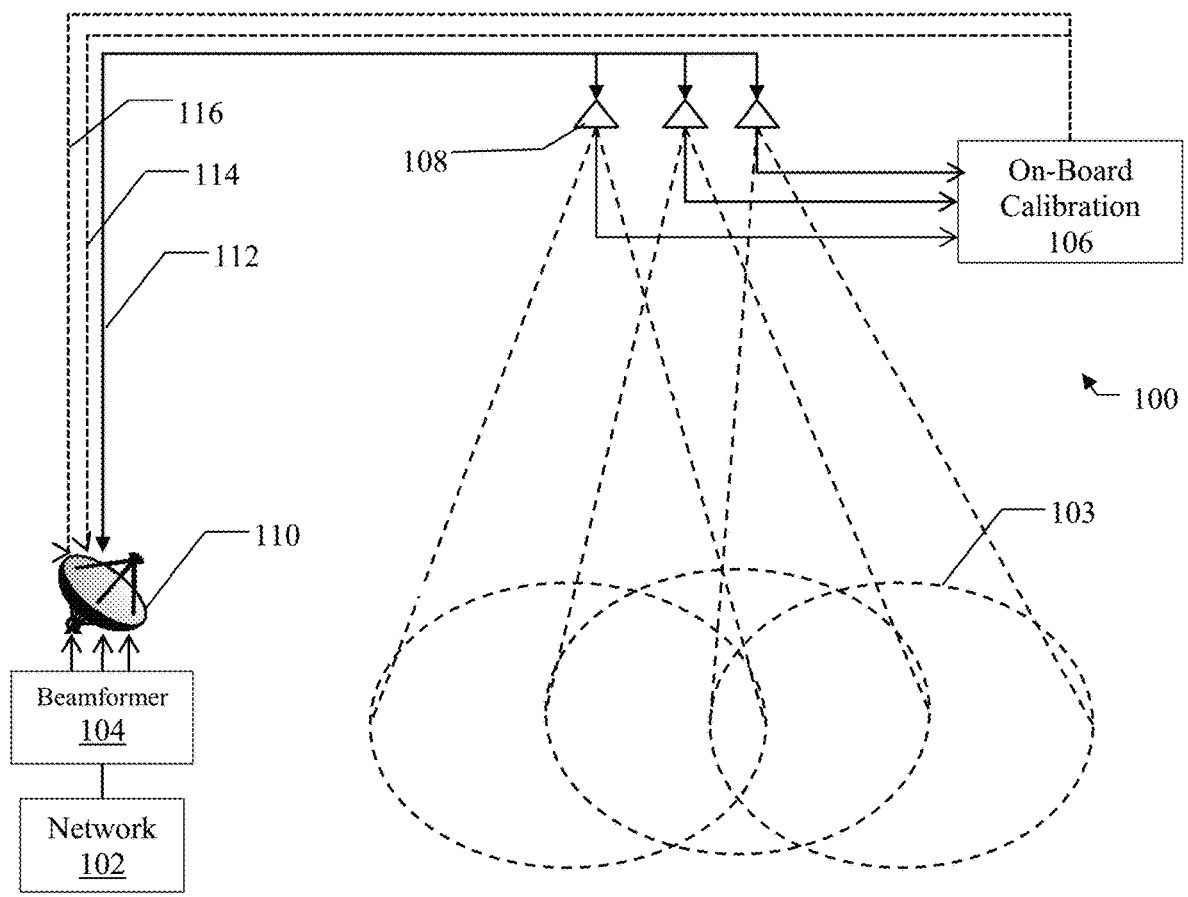
FIG. 1a illustrates a prior art Ground Based Beam Forming (GBBF) system including an on-board calibration network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Figure 1B:
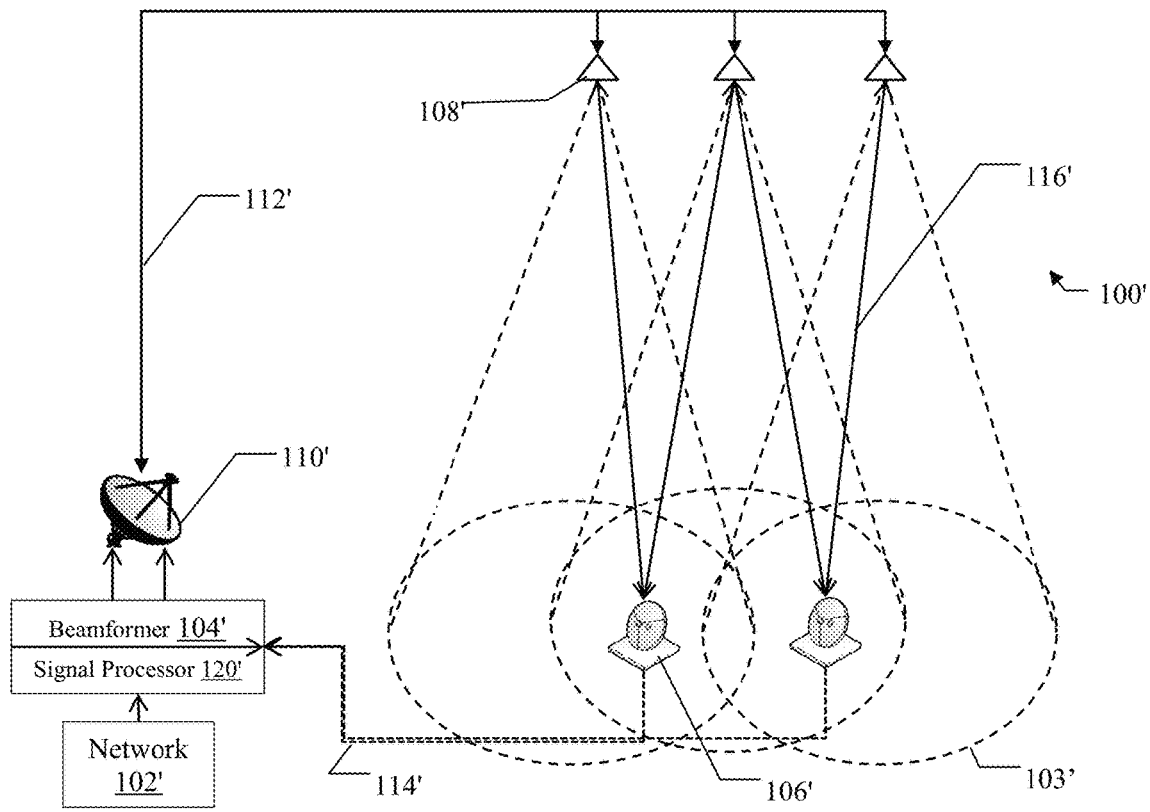
FIG. 1b illustrates a Ground Based Beam Forming (GBBF) system including a Calibration Earth Station (CES) assisted calibration network.

In the Ground Based Beam Forming (GBBF) system 100' of FIG. 1b, there is a need for installing Calibration Earth Stations (CESs) 106' on the ground. Even though the system 100' provides a reduction in the cost due to a simplified payload in a platform, there is an additional motivation, based on system economics and maintenance, to minimize a count of CESs. Multiple CESs are needed in the system 100' because, as shown in FIG. 1b, different elements of an antenna's array have "visibility" to different geographic areas in the platform's coverage area (i.e., one CES, no matter where it is positioned, cannot see all the elements of the platform's antenna array). This leads to a CES calibration (imbalance) problem; without limitation, it is difficult to ensure that Radio Frequency (RF) gain and phase offsets introduced by any local front-end hardware of the different CESs are perfectly aligned. Without limitation, the task of GBBF calibration becomes challenging in part because the CESs used to calibrate the GBBF are not calibrated.

The present teachings provide a description of the GBBF calibration problem and a calibration solution that relies on uncalibrated CESs. The present teachings disclose the criteria used in CES location determination, description of the location search procedure and several numerical results of this process.

FIG. 1b illustrates a Ground Based Beam Forming (GBBF) system including a Calibration Earth Station (CES) assisted calibration network.

In the network of FIG. 1b, a GBBF system 100' includes a GBBF beamformer 104', a set of Calibration Earth Stations (CESs) 106' and a signal processor 120'. The GBBF beamformer 104' inserts a channel sounding pilot signal 112' on each of the FDM channels on a forward link to the set of Calibration Earth Stations (CESs) 106' installed at different locations within a platform's (for example, a satellite, a high attitude platform, or the like) service link coverage area 103'. The GBBF beamformer 104' may be co-located with a gateway 110' and a signal processor 120'. The CESs 106' transmit channel sounding pilot signals 116' on the return link and receive a different set of pilot signals 112' on the forward link. As in the approach of FIG. 1a, the pilot signals 112' and 116' traverse the FDM paths between the beamformer 104' and the platform including antenna elements 108'. However, unlike the first approach, the platform is unaware of the presence of the pilot signals in the FDM bands and simply transports the entire band, including a user traffic signal ensuing from a network 102' and the GBBF/CES pilot signals 112' and 116', from feeder link to the service link and vice versa. The signal processor 120' can calculate the calibration parameters based on the various channel sounding pilot signals 112' received by that CES 106' to forward the calibration parameters via link 114'. In some embodiments, the signal processor 120' may be disposed at the CES 106'. In some embodiments, the signal processor 120' may be collocated with the beamformer 104'. As an on-board pilot signal loopback network (i.e., an onboard calibration network 106 of FIG. 1a) is not required by a system of FIG. 1b, the platform design is simplified, and SWaP and cost of the payload is reduced compared to the approach of FIG. 1a.

GBBF Calibration Problem and Its Solution

Figure 2:
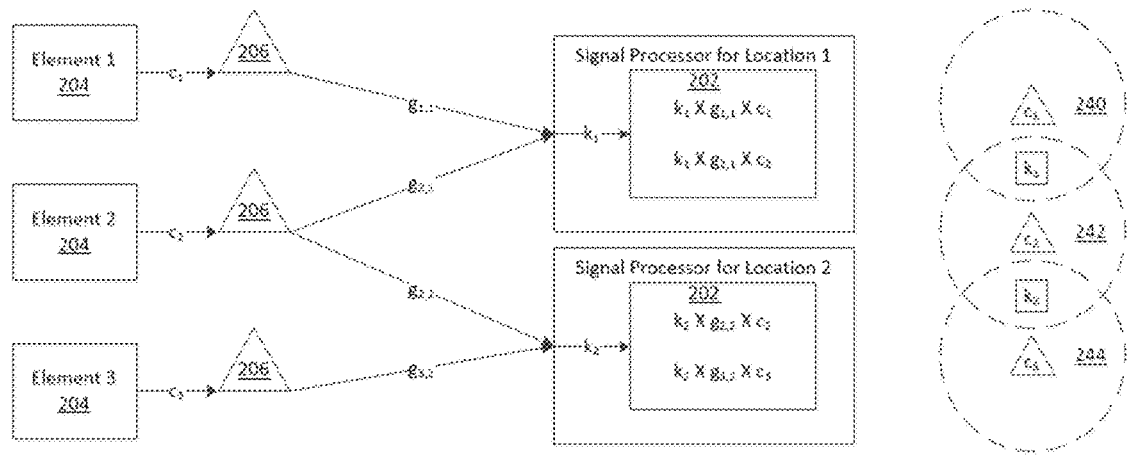
FIG. 2 illustrates a logical diagram of an evaluation of channel parameters using paths that connect pairs of channel nodes for an exemplary coverage contour according to various embodiments.

FIG. 2 illustrates a logical diagram of an evaluation of channel parameters using paths that connect pairs of channel nodes for an exemplary coverage contour according to various embodiments.

The GBBF calibration problem maybe stated as how to unambiguously separate complex-valued calibration parameters c from a perturbation k given a set of CES measurements that contain the product of these two unknowns. The following paragraphs describe how to calculate the parameter set c from a sparse measurement matrix R. In exemplary embodiments, the matrix R contains contributions from all channels. The use of the word "sparse" for matrix R signifies a signal quality, where the signal is not of sufficient strength for some (CES, element) combinations. In other words, there are some elements that will not be visible to a CES that produces adequate signal quality and thus sparse. GBBF calibration using CESs has the following aspects:

Multiple CESs may be used to measure complex-valued calibration parameters $c=\{c_1, c_2, \ldots c_M\}$ of the onboard array with M elements; each of a total of L CESs measures only a part (a sparse subset) of the parameter set c.

Different subsets of calibration measurements (from different CESs) cannot be easily "fused" to derive the unique estimate of vector c as each subset is affected by an unknown, CES-specific, perturbation $k_l$ (with $l=1, \ldots, L$).

Let $R_{l,m}=k_l \times g_{l,m} \times c_m + \tilde{u}_{l,m}$ denote the measurement of the $l^{th}$ CES pilot signal that experiences the feeder link channel imbalance of $c_m$ for the $m^{th}$ Frequency Division Multiplexing (FDM) band, a CES-induced offset of $k_l$, a secondary pattern gain of $g_{l,m}$ between $l^{th}$ CES and $m^{th}$ feed element, and a noise component $\tilde{u}_{l,m}$.

The effect of the complex-valued channel connection $g_{l,m}$ in the measurement $\tilde{R}_{l,m}$ can be compensated for by normalizing the latter by an estimate $\hat{g}_{l,m}$ of $g_{l,m}$. The normalized measurement $$R_{l,m} = \frac{\tilde{R}_{l,m}}{\hat{g}_{l,m}} = k_l \times c_m + u_{l,m}$$

includes an error due to the scaled additive noise and interference $$u_{l,m} = \frac{\tilde{u}_{l,m}}{\hat{g}_{l,m}}.$$

plus an error due to the error in the estimation $\hat{g}_{l,m}$ of the actual secondary pattern connection $g_{l,m}$. This normalized set of receiver measurements $\{R_{l,m}\}$ forms a matrix R represented as: $R=k_{L \times 1} c_{1 \times M}^T + N_{L \times M}$.

A communication channel may provide signal coverage over a coverage area 240, 242, 244. The communication channel may traverse a relay TD beacon transmitter (such as, element 1 204, element 2 204, and element 3 204) connected to channel nodes 206 via communication paths having distinct feed element parameters $c_1$, $c_2$ and $c_3$ that may be used as complex-valued calibration parameters. An element to receiver connection may be affected by a secondary pattern gain of $g_{l,m}$.

In FIG. 2, an estimation of feed element parameters $c_1$ and $c_3$ is not feasible from the measurements $R_{11}=k_1 \times c_1 + n_{11}$ and $R_{23}=k_2 \times c_3 + n_{23}$. Although the measurements contain the channel coefficients $c_1$ and $c_3$ of interest, they also have the undesired CES offset terms $k_1$ and $k_2$. In FIG. 2, the undesired CES offset terms $k_1$ denotes the effect of $c_1$ and $c_2$ on each other, and the undesired CES offset terms $k_2$ denotes the effect of $c_2$ and $c_3$ on each other. Furthermore, the corresponding measurement matrix R is too sparse to be of use in estimation of $c_1$ and $c_3$.

The parameters can, however, be estimated using a "link", i.e., the measurements $R_{l,2}=k_l \times c_2 + n_{l,2}$ of a common channel element $c_2$ at both the CESs $l=1$ and $l=2$. Using these measurements, CES offset $k_1$ can be estimated relative to the CES offset $k_2$ as $$k_1^2 \stackrel{def}{=} \frac{\hat{k}_1}{\hat{k}_2} = \frac{R_{12}}{R_{22}}.$$

Next, using the relative estimate $k_1^2$ obtained in the above manner, the channel parameter set $c=\{c_1, c_2, c_3\}$ can be estimated as follows: $c \propto k_1 \times \{c_1, c_2, c_3\} = \{R_{11}, R_{12}, k_1^2 \times R_{23}\}$. A proper placement of CESs is necessary to allow the "bridging" by element 2 in this example. A signal processor 202 for location 1 may be used to determine ratio of c1 and c2. A signal processor 202 for location 2 may be used to determine ratio of c2 and c3. However, to get a reliable comparison between c1 and c3 visible to two different CESs, the k1 and k2 factors have to be calibrated. This motivates the need for a CES to have at least one common element visible to both CES1 and CES2. This common element in FIG. 2 is element 2 204. One objective of the CES location determination is to meet this criterion of the same element being visible to more than one CES.

CES Location Selection

The present teachings determine locations of the CESs on the ground so that the calibration process can converge and attain a high estimation accuracy. The CES location finding problem can be viewed as being similar to defining the parity check matrix H for the LDPC codes. In regular LDPC codes, there is certain fixed numbers of ones and zeros distributed in a pseudorandom manner along each row and each column of the sparse matrix H. Similarly, matrix R in equation above is sparse since many of the CESs fall in low sidelobes of the secondary beam pattern of a feed. As the bit (or parity check) nodes of LDPC codes are analogous to feed (or CES) nodes of FIG. 2, the objective in CES location selection is to ensure that each column of matrix R has at least several strong secondary pattern connections (i.e., each feed is able to see at least a few CESs), and similarly, each row of R also has some minimum number of secondary pattern connections (i.e., each CES is able to see certain minimum number of feeds). Referring to FIG. 2, there should be at least one "bridging" CES (for example, element 2 204 in FIG. 2) that can connect two neighboring feeds and similarly there should be feed(s) that can bridge the connection between two neighboring CESs.

The above discussion motivates defining the following criteria for determining the number of CESs and their locations:

Criterion A: each feeder element has at least $L_k$ CES sites (where k=1, 2, ..., K) within $\zeta_k^A$ dB in power degradation relative to the peak of the feeder beam. For example, let values of K=3, $\{L_1, L_2, L_3\}=\{1, 2, 5\}$ and $\{\zeta_1^A, \zeta_2^A, \zeta_3^A\}=\{-6, -10, -15\}$ dB correspond to the following instantiation of Criterion A: (the number of CESs and their locations may be such that) there is at least one CES within $-6$ dB contour, two CESs within $-10$ dB contour and five CESs within $-15$ dB contour of any feed element.

Criterion B: each CES has connectivity to least $M_j$ feeds (j=1, ..., J) where $j^{th}$ feed is visible at the CES no less than $\zeta_j^B$ dB suppressed in power relative to the peak of the secondary beam.

In some embodiments, the optimization problem at hand is to minimize the number of CESs by judiciously selecting their positions such that the above criteria are met for all feed elements and all CESs. Several different optimization techniques are applicable for solving this problem. We posit following several desirable properties that any solution may have.

1) Fairness. The optimization may be fair to all CESs and all feeds. Although intermediate steps of the optimization process may follow a greedy approach, the final outcome may not be biased such that a disproportionate number of CESs is allotted to only a few feeds.
2) Priority specification. The optimization allows an a-priori specification of feed priority, i.e., it may be possible to override the fairness property mentioned above for specific feeds. For example, if a feed's secondary pattern is partly or wholly outside the coverage area of interest, it may be possible to place a reduced priority in the attainment of Criterion A for that feed.
3) Robustness to satellite motion. Contours on the ground (or the footprints) corresponding to different off-peak feed antenna gain levels (i.e., constant $\zeta_k^A$ and $\zeta_j^B$ levels) are non-stationary. When the satellite service region is in the Northern Hemisphere, the footprint of a given secondary elemental beam on Earth's surface is the smallest when the satellite is at the northern-most point in its orbit. This footprint increasingly elongates as the satellite moves southward from this position. In addition to the diurnal motion, satellite pointing errors also cause a variation in the projection of feed element's secondary beam pattern on the ground. A satellite's pointing error in the Roll dimension results in an effect in the antenna UV plane that is similar to that of the satellite latitude diurnal variations, i.e., the Roll error translates to shift in V dimension. Similarly, a Pitch error translates to a shift in the U dimension, and a Yaw error results in a radial shift. Both the criteria stated above may be met by the chosen CES locations in presence of these variations of the footprints of elemental secondary patterns.
4) Specification of geographical preferences and constraints. Due to regulatory and geo-political considerations, certain locations and areas are prohibited for placement of CESs, while geographical considerations make many other areas on the Earth, such as water bodies, hard to access locations (mountains, forests, deserts and polar regions, etc.) impractical. Similarly, there may be certain locations of practical preference for CES placement (e.g., established antenna sites/antenna farms with good visibility to the satellite). It may be possible to account for such preferences and constraints in CES location search.

Determination of a set of CES locations, and the minimum required cardinality of this set, that meets the selection criteria A and B involves at least a computationally intensive search procedure due to a large search space. If the number of candidate locations within the satellite coverage region is limited to $N_c$ (by discretizing the search space), the total number of possible choices of locations of L CESs is given by the Binomial coefficient $$\binom{N_c}{L}.$$

As a simple demonstrative example, if we suppose that the candidate locations of CESs are the points of a latitude/longitude grid of resolution 0.5° (roughly 55 km separation between the grid points at the equator) whose span is, say, 40° in both East-West and North-South directions (which is a reasonably sized region of coverage for a GEO system), there is a total of $N_c$=6400 candidate locations. Even for a small number L of CESs (e.g., 10), $$\binom{N_c = 1600}{L = 10}$$

exceeds $10^{25}$. Exhaustive search of the locations (in which Criteria A and B mentioned earlier are evaluated and examined for each candidate location set individually) is clearly impractical.

The present teachings rely upon a heuristic search based on Simulated Annealing. The search procedure includes an inner loop and an outer loop. The inner loop performs the main search procedure for the locations, its high-level pseudocode maybe as follows:

```
input : Number of CESs: L
input : Feed priorities: w
input : Annealing schedule: σ
input : Accept probabilities p^Accept
output: Locations of CESs: z_o
configure i_max to a desired number;
configure currentMin to a high number;
i ← 0, convergenceFlag ← 0;
Generate L CES locations z_i = [u_i', u_i']_{l=1}^L;
z ← z_i;
while i < i_max and convergenceFlag = 0 do
|   costMetric = costFunction(z_i, w_i);
|   if costMetric < threshold then
|   |   z_o ← z :
|   |   convergenceFlag ← 1
|   else if costMetric < currentMin then
|   |   currentMin ← costMetric;
|   |   z ← z_i
|   else
|   |   if uniformRVgen(costMetric−currentMin)
|   |       < p_i^Accept then
|   |   |   z ← z_i
|   |   end
|   |   n ← thermalNoiseGen(2 × L);
|   |   z_i ← z + σ_i *n;
|   end
|   i ← i + 1;
end
```

The inner loop takes as the input the number L of CES locations. It is driven by a binary cost function and a L1 metric. Cost of a candidate set of CES locations is zero for a given feed if these locations collectively satisfy Criterion A for this feed; otherwise the cost of this set of locations is unity for that feed. Similarly, the cost is zero for a given CES if Criterion B is met for this CES. The cost function, i.e., evaluation of Criteria A and B, is additionally dependent on feed priority assignment. Process searches for that set of CES locations which makes this cost function to be zero valued for all feeds and all CESs.

The process is initialized with a total of L randomly generated CES locations $z_0=[u_0^l, v_0^l]_{l=1}^L$ in satellite antenna [U, V] coordinates. With the initial set of CES locations (i=0), the binary cost function mentioned above is typically nonzero for many feed elements/CESs. To improve the cost function at $i^{th}$ iteration, an iid (thermal) Gaussian noise vector of length 2×L and variance $\sigma_i^2$ is generated. Coordinates $[u_{i-1}^l, v_{i-1}^l]$ of the previous set of locations are perturbed using this noise vector. The perturbed set is ensured to satisfy the geographical constraints and preferences. If $L_1$ cost function (sum of feeds/CESs for which Criteria A and B are not met) with the perturbed set of locations is smaller, this set is accepted as the new candidate set. If not (i.e., the cost function is worsened with the perturbed set of locations), the set may still be accepted, but with a certain small (variable) probability $p_i^{Accept}$, this allows the search procedure to not get trapped in a local minima. Process iterates by incrementing the iteration index i, (optionally) changing the variance $\sigma_i^2$ of thermal noise according to an annealing schedule and (optionally) changing the accept probability $p_i^{Accept}$. The annealing schedule and the accept probabilities may be designed to allow a high variation in search procedure for initial iterations of the process, with this variation reducing as the iterations progress. The process is declared to have converged if the cost function is satisfied either for all feeds/CESs, or for a designated set of high-priority feeds. The process is declared to have not converged if the rate of reduction of the cost function with the iteration index remains greater than a specified threshold. This stopping criterion is critical, as mentioned later, to ensure that the operation of this inner loop in conjunction with the outer loop does not become computationally intractable.

Figure 3A:
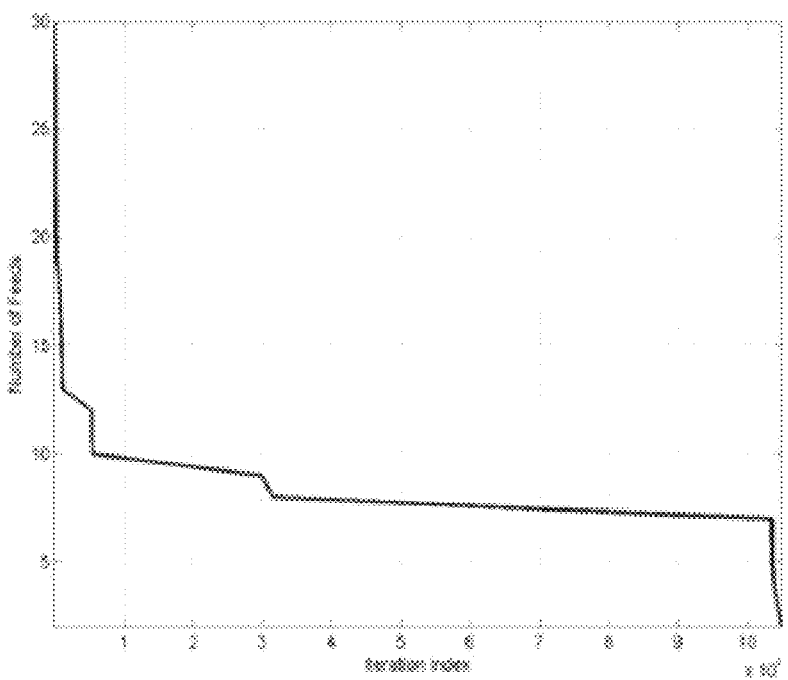
FIG. 3a illustrates an example profile of convergence of an inner loop process in numerical search of CES locations (Y axis shows the number of feeds for which the optimization criteria are not met as a function of algorithm iteration index), according to various embodiments.

FIG. 3a illustrates an example profile of convergence of an inner loop process in numerical search of CES locations (Y axis shows the number of feeds for which the optimization criteria are not met as a function of algorithm iteration index), according to various embodiments.

FIG. 3a illustrates that as the number of iterations increases, the number of feeds for which the optimization criteria are not met decreases.

Figure 3B:
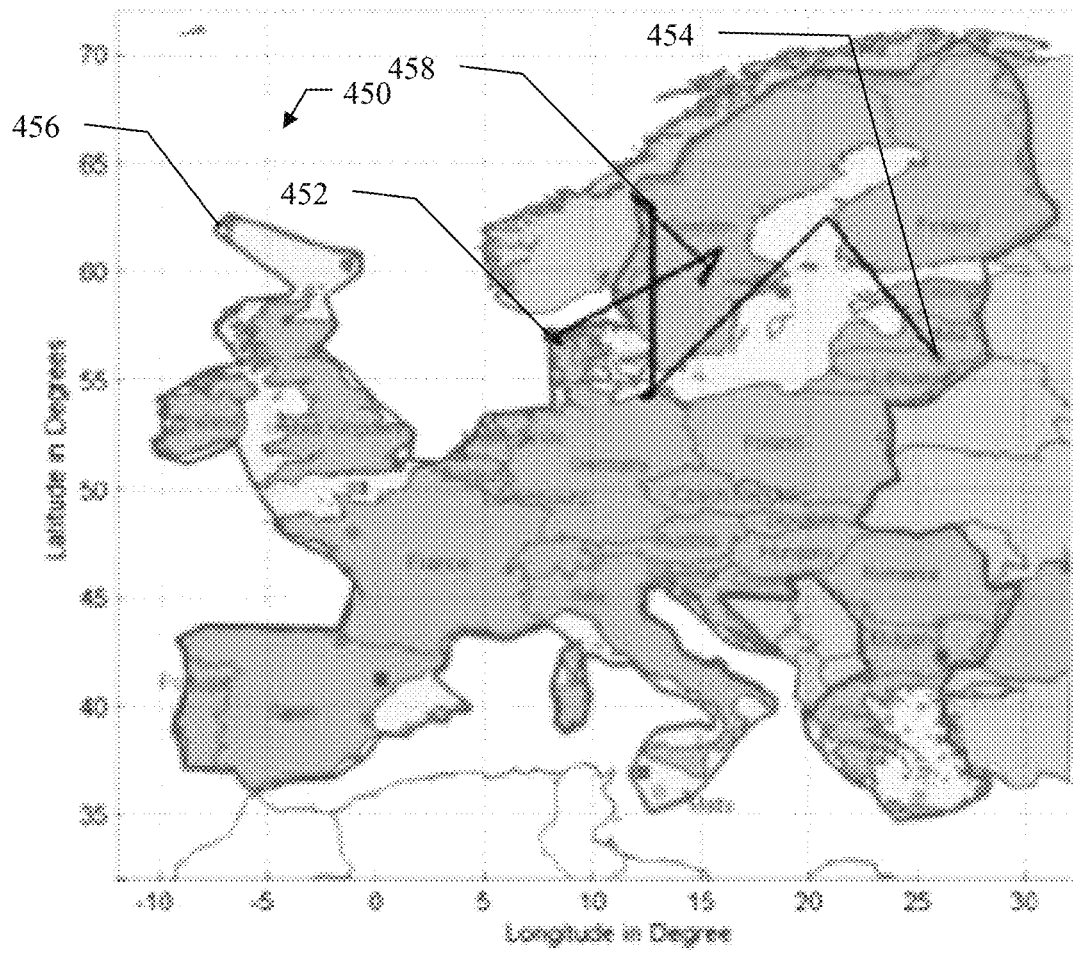
FIG. 3b illustrates a relocation of an initial CES position during an iterative search with a final position, according to various embodiments.

FIG. 3b illustrates a relocation of an initial CES position during an iterative search with a final position, according to various embodiments.

FIG. 3b illustrates a coverage area 450 as defined by a border 456. An exemplary CES may be initially positioned at location 452 within the coverage area 450. After a number of interior loop iterations an optimal location for the exemplary CES may be determined to be at location 454. Within the iterations the location of the exemplary CES may be calculated at various points that results from a systematic perturbation of locations that is applied at the end of each iteration, for example line 458.

FIG. 3a and FIG. 3b provide several example illustrations of the convergence of the inner loop when applied to a GEO satellite antenna secondary feed patterns.

As mentioned earlier, practical considerations dictate locating a certain number of CES sites at pre-designated locations. Furthermore, there may be certain "soft" preferences; e.g., populous areas may be preferred over the remote areas due to the easier accessibility of the former (alternatively, the latter may be preferred over the former because of a reduced cost of installation and a lower likelihood of interference from terrestrial cellular systems operating in the same or adjacent spectrum as the satellite system). The iterative location search procedure is modified to take certain designated locations of CESs, say, a total of $L_0 < L$ as a-priori locations and search for the locations of the remaining $L-L_0$ CESs. Similarly, it takes as another input the database of the populous areas within the coverage and constrains the search over only those locations which are in this database.

The inner loop of the process operates in conjunction with an outer loop. The outer loop iterates over the number L of CES locations; L is varied after each increment of the outer loop. If L is too small, the search procedure cannot converge and the inner loop terminates since the rate of reduction of cost function with the iterations of the inner loop does not fall below the convergence threshold. The outer loop keeps incrementing L until the inner loop converges. While L is controlled by the outer loop prior to the start of the inner loop, a calibration simulation based rank ordering of the obtained solution sets is conducted at the termination of inner loop.

To make the GBBF calibration robust to outages of a few CESs out of L in an operational system, it may be preferred to make the number L of CESs somewhat (e.g., 20%) larger than the minimum $L_{min}$. When the outer loop initiates the inner loop with $L > L_{min}$, the inner loop may provide more than one solution of the search problem. While the CES location sets identified by the inner loop are optimized to satisfy the two selection criteria mentioned earlier, the search procedure does not measure the performance of the calibration process that uses the identified set of CES locations. Therefore, whenever the inner loop provides more than one solution sets, a comparative evaluation of the solution sets is conducted by evaluating how well the calibration process performs with each of these sets. The solution set that performs the best at the end of the output is selected as the final set of locations.

Figure 4:
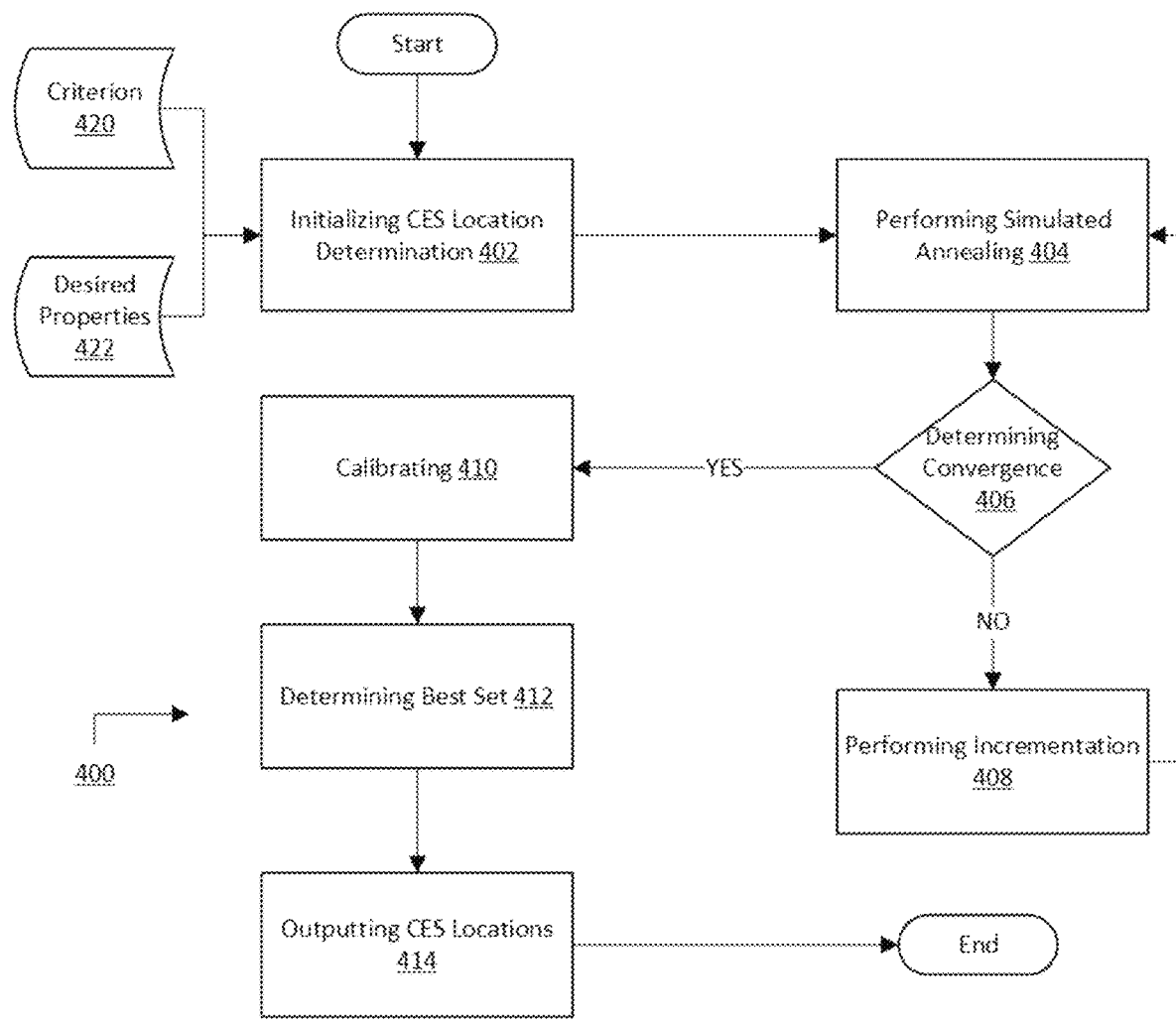
FIG. 4 illustrates a method for determining a Calibration Earth Station (CES) location, where the CES receives a signal from an antenna array with M elements, according to various embodiments.

FIG. 4 illustrates a method for determining a Calibration Earth Station (CES) location, where the CES receives a signal from an antenna array with M elements, according to various embodiments.

A method 400 for estimating calibration parameters for a Calibration Earth Station (CES) receiving a signal from L×M measurements in a matrix R from L CESs and M feed elements may be implemented using the modules and processes described above. The method 400 may include an operation 402 for initializing CES location determination. The operation 402 may load a criterion 420 as part of the initialization. The operation 402 may load desired properties 422 as part of the initialization. The method 400 may include an operation 404 for performing a simulated annealing for various sets of L locations. The simulated annealing may be performed per the inner loop described herein. The method 400 may include an operation 406 for determining convergence. When there is no convergence, the method 400 includes an operation 408 for performing incrementation. The incrementation may be performed per the outer loop described herein. After operation 408, the method 400 may include repeating operation 404 until the operation 406 determines that there was a convergence.

When there is convergence, the method 400 may include an operation 410 for estimating, via simulation, a calibration of the L feed elements. The method 400 may include an operation 412 for determining a best set of locations by selecting a set with the lowest residual calibration error. The method 400 may include an operation for outputting the CES locations of the best set, for example, a set that has the lowest residual calibration error. The process 400 may be performed offline as an estimation of optimal locations and perturbations expected at the locations.

Figure 5:
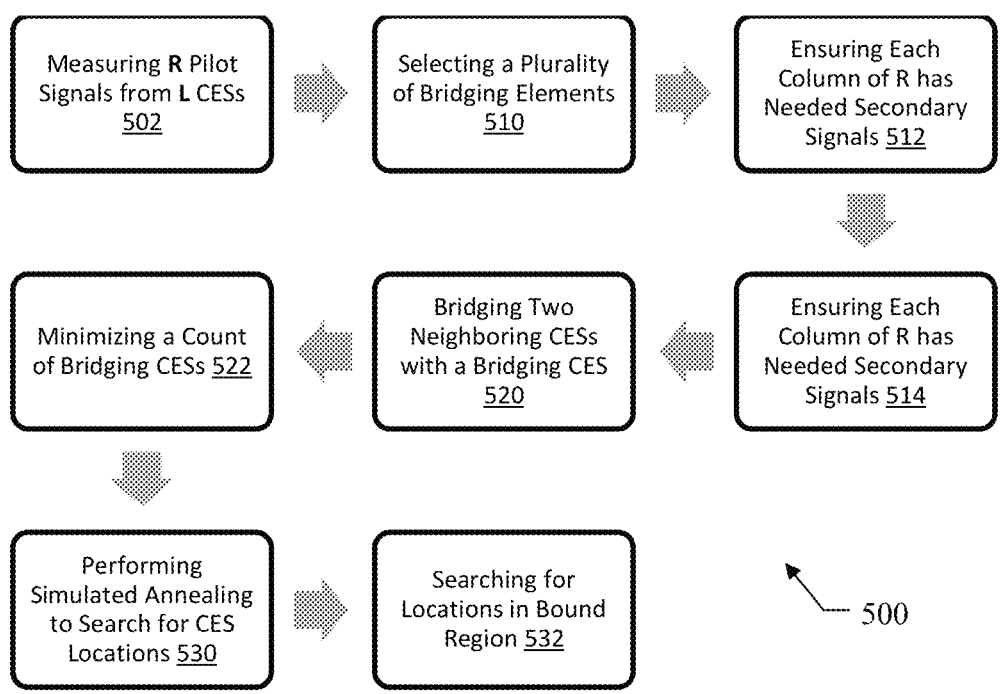
FIG. 5 illustrates a method for locating a Calibration Earth Station (CES), according to various embodiments.

FIG. 5 illustrates a method for locating a Calibration Earth Station (CES), according to various embodiments.

A method 500 for locating a Calibration Earth Station (CES) may be implemented using the modules and processes described above. The method 500 may include an operation 502 for measuring R pilot signals from L CESs. The method 500 may include an operation 510 for selecting a plurality of bridging elements. The method 500 may include an operation 512 for ensuring each column of R has a number of secondary signals. The method 500 may include an operation 514 for ensuring that each column of R has a number of needed secondary signals. The method 500 may include an operation 520 for bridging two neighboring CESs with at least a bridging feed element and for bridging two neighboring feed elements with at least a CES. The method 500 may include an operation 522 for minimizing a count of bridging CESs. The method 500 may include an operation 530 for performing simulated annealing to search for CES locations. The method 500 may include an operation 532 for searching for locations in a bound region.

While the GBBF provides a benefit by reducing the satellite design complexity/cost and by increasing the capability and flexibility of the beamformer signal processing, it requires a detailed development of a calibration system. The present teachings disclose an approach for GBBF calibration that relies upon CESs deployed at several locations within the service area. A heuristic approach for numerical determination of the number of CESs and their locations is disclosed. The CES locations are systematically determined by an optimization of several criteria, which facilitates the calibration in the operational system.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for estimating calibration parameters and locating a Calibration Earth Station (CES) receiving a signal from an antenna array with M feed elements, the method comprising:
providing L×M pilot signal measurements in a matrix R from L CESs and the M feed elements, wherein the matrix R comprises a set of channel coefficients c={c1, c2, . . . , cM}, and k={k1, k2, . . . , kL} perturbations;
linking a subset of channel coefficients {c1, c2, . . . , cM} using each of the L CESs;
estimating a relative estimate of the k={k1, k2, . . . , kL} perturbations across the L CESs by using one of the M feed elements as a bridging element;
performing the estimating for a plurality of sets of L locations;
calculating a residual calibration error for each set of the plurality of sets of L locations; and
selecting a set from the plurality of sets of L locations having a lowest residual calibration error,
wherein the bridging element provides a strong pilot signal measurement for at least two of the L CESs.

2. The method of claim 1, the method further comprising: providing criterion comprising specifying that each of the one or more bridging elements has at least $L_k$ CES sites (where k=1, 2, . . . , K) within $\zeta_k^A$ dB in power degradation relative to a peak of a feeder beam.

3. The method of claim 1, the method further comprising: providing criterion comprising specifying geographical preferences and constraints.

4. The method of claim 1, the method further comprising: providing criterion comprising specifying that each of the one or more bridging elements has connectivity to least $M_j$ feeds (j=1, . . . , J) where a $j^{th}$ feed is visible at a CES no less than $\zeta_j^B$ dB suppressed in power relative to a peak of a secondary beam.

5. The method of claim 1, the method further comprising: minimizing L by selecting the location for each of the L CESs such that each of the one or more bridging elements is allotted about an equal number of feed elements of the M feed elements.

6. The method of claim 1, the method further comprising: selecting the location for each of the L CESs such that each of the one or more bridging elements meets a priority specification.

7. The method of claim 1, the method further comprising: selecting the location for each of the L CESs such that variations of footprints of elemental secondary patterns of a satellite at the selected locations are minimized.

8. The method of claim 1, wherein the determining comprises generating locations of the L CESs at random, performing the estimating for the L CESs, monitoring a performance of the estimating, and incrementing a count of the L CESs locations based on the performance of the estimating.

9. The method of claim 1, further comprising: performing simulated annealing with each of the L CESs and at least two neighboring feeds to search for locations of the L CESs.

10. A system to estimate calibration parameters and locate a Calibration Earth Station (CES) receiving a signal from an antenna array with M feed elements, the system comprising:
  a matrix R to provide L×M pilot signal measurements from L CESs and the M feed elements, wherein the matrix R comprises a set of channel coefficients c={c1, c2, . . . , cM}, and k={k1, k2, . . . , kL} perturbations; and
  a signal processor
    to link a subset of channel coefficients {c1, c2, . . . , cM} using each of the L CESs, and
    to estimate a relative estimate of the k={k1, k2, . . . , kL} perturbations across the L CESs by using one of the M feed elements as a bridging element,
  wherein the bridging element provides a strong pilot signal measurement for at least two of the L CESs and
  wherein the signal processor performs the estimating for a plurality of sets of L locations, calculates a residual calibration error for each set of the plurality of sets of L locations, and selects a set from the plurality of sets of L locations having a lowest residual calibration error.

11. The system of claim 10, the system further comprising: a criterion specifying that each of the one or more bridging elements has at least $L_k$ CES sites (where k=1, 2, . . . , K) within $\zeta_k^A$ dB in power degradation relative to a peak of a feeder beam.

12. The system of claim 10, the system further comprising: a criterion specifying that each of the one or more bridging elements has connectivity to least $M_j$ feeds (j=1, . . . , J) where a $j^{th}$ feed is visible at a CES no less than $\zeta_j^B$ dB suppressed in power relative to a peak of a secondary beam.

13. The system of claim 10, wherein the signal processor minimizes L by selecting the location for each of the L CESs such that each of the one or more bridging elements is allotted about an equal number of feed elements of the M feed elements.

14. The system of claim 10, wherein the signal processor selects the location for each of the L CESs such that each of the one or more bridging elements meets a priority specification.

15. The system of claim 10, wherein the signal processor selects the location for each of the L CESs such that variations of footprints of elemental secondary patterns of a satellite at the selected locations are minimized.

16. The system of claim 10, wherein the signal processor generates locations of the L CESs at random, performs the estimating for the L CESs, monitors a performance of the estimating, and increments a count of the L CESs locations based on the performance of the estimating.

17. A method for locating a set of Calibration Earth Stations (CES), the method comprising:
  providing pilot signal measurements matrix R from L CESs and M feed elements, wherein R comprises a set of channel coefficients c={c1, c2, . . . , cM}, {k=k1, k2, . . . , kL} perturbations, and a noise component N;
  ensuring that each column of matrix R includes a plurality of strong secondary pattern connections;
  ensuring that each row of R includes the plurality of strong secondary pattern connections;
  bridging two neighboring CESs of the L CESs with at least two neighboring feeds, and two neighboring feeds of the M feed elements with at least one CES;
  performing simulated annealing with the at least one CES and the at least two neighboring feeds to search for locations of the L CESs;
  calculating a residual calibration error for each of the locations of the L CESs, and
  selecting locations having a lowest residual calibration error,
  wherein the bridging comprises a plurality of bridge CESs.

18. The method of claim 17, further comprising minimizing a count of the plurality of bridge CESs.

19. The method of claim 17, further comprising searching for locations of the plurality of bridge CESs within a geographic region, wherein the geographic region is a subset of a satellite coverage region.

* * * * *